United States Patent
Sasada

(10) Patent No.: US 10,929,990 B2
(45) Date of Patent: Feb. 23, 2021

(54) REGISTRATION APPARATUS, METHOD, AND PROGRAM

(71) Applicant: FUJIFILM Corporation, Tokyo (JP)

(72) Inventor: Ryoji Sasada, Tokyo (JP)

(73) Assignee: FUJIFILM Corporation, Tokyo (JP)

(*) Notice: Subject to any disclaimer, the term of this patent is extended or adjusted under 35 U.S.C. 154(b) by 325 days.

(21) Appl. No.: 16/127,379

(22) Filed: Sep. 11, 2018

(65) Prior Publication Data

US 2019/0096072 A1 Mar. 28, 2019

(30) Foreign Application Priority Data

Sep. 27, 2017 (JP) .............................. JP2017-185648

(51) Int. Cl.
*G06T 7/38* (2017.01)
*G06T 7/33* (2017.01)
*G06T 7/32* (2017.01)

(52) U.S. Cl.
CPC .................. *G06T 7/38* (2017.01); *G06T 7/32* (2017.01); *G06T 7/337* (2017.01); *G06T 2207/10076* (2013.01); *G06T 2207/10081* (2013.01); *G06T 2207/10088* (2013.01); *G06T 2207/10104* (2013.01)

(58) Field of Classification Search
USPC ......................................... 382/131, 294, 128
See application file for complete search history.

(56) References Cited

U.S. PATENT DOCUMENTS 5,673,300 A * 9/1997 Reckwerdt ........... A61N 5/1042
378/65
5,937,083 A * 8/1999 Ostuni .................. G06T 3/0068
382/131

(Continued)

FOREIGN PATENT DOCUMENTS

JP          8-103439 A     4/1996
JP       2005-87727 A     4/2005

(Continued)

OTHER PUBLICATIONS

Japanese Office Action dated Aug. 4, 2020 for corresponding Application No. 2017-185648 with an English translation.

*Primary Examiner* — Ishrat I Sherali
(74) *Attorney, Agent, or Firm* — Birch, Stewart, Kolasch & Birch, LLP

(57) ABSTRACT

There are provided a registration apparatus, method, and program capable of performing high-speed registration between three-dimensional images included in imaging series included in different examinations.

An accessory information acquisition unit acquires, from each of two examinations including a plurality of imaging series including three-dimensional images each of which is configured to include a plurality of tomographic images, accessory information regarding the three-dimensional images. A series selection unit selects one imaging series from each of the two examinations based on the accessory information. A registration unit performs registration between the three-dimensional images included in the imaging series of the two examinations based on images included in the selected imaging series and acquires a result of the registration as a registration result between the two examinations.

17 Claims, 6 Drawing Sheets

(56) References Cited

U.S. PATENT DOCUMENTS

| | | | |
|---|---|---|---|
| 7,410,258 B2* | 8/2008 | Tan | A61B 3/1225 |
| | | | 351/246 |
| 8,334,878 B2* | 12/2012 | Moriya | G16H 30/20 |
| | | | 345/619 |
| 8,938,111 B2* | 1/2015 | Kingston | G01N 23/046 |
| | | | 382/131 |
| 2003/0035507 A1* | 2/2003 | Hsu | G06T 7/136 |
| | | | 378/4 |
| 2013/0177224 A1* | 7/2013 | Papageorgiou | A61B 5/0035 |
| | | | 382/131 |
| 2014/0204242 A1 | 7/2014 | Anderson | |
| 2015/0324536 A1* | 11/2015 | Shie | G06F 16/5866 |
| | | | 715/753 |
| 2016/0314589 A1* | 10/2016 | Nagao | G06F 19/321 |
| 2017/0039321 A1* | 2/2017 | Reicher | G06F 16/583 |
| 2017/0239375 A1* | 8/2017 | Bell, III | A61K 49/0097 |
| 2018/0300889 A1* | 10/2018 | Tanaka | G06T 7/73 |

FOREIGN PATENT DOCUMENTS

| | | | |
|---|---|---|---|
| JP | 2009-232981 A | 10/2009 | |
| JP | 2014-525079 A | 9/2014 | |
| JP | 2016-22008 A | 2/2016 | |
| JP | 2016-202721 A | 12/2016 | |

* cited by examiner

FIG. 4

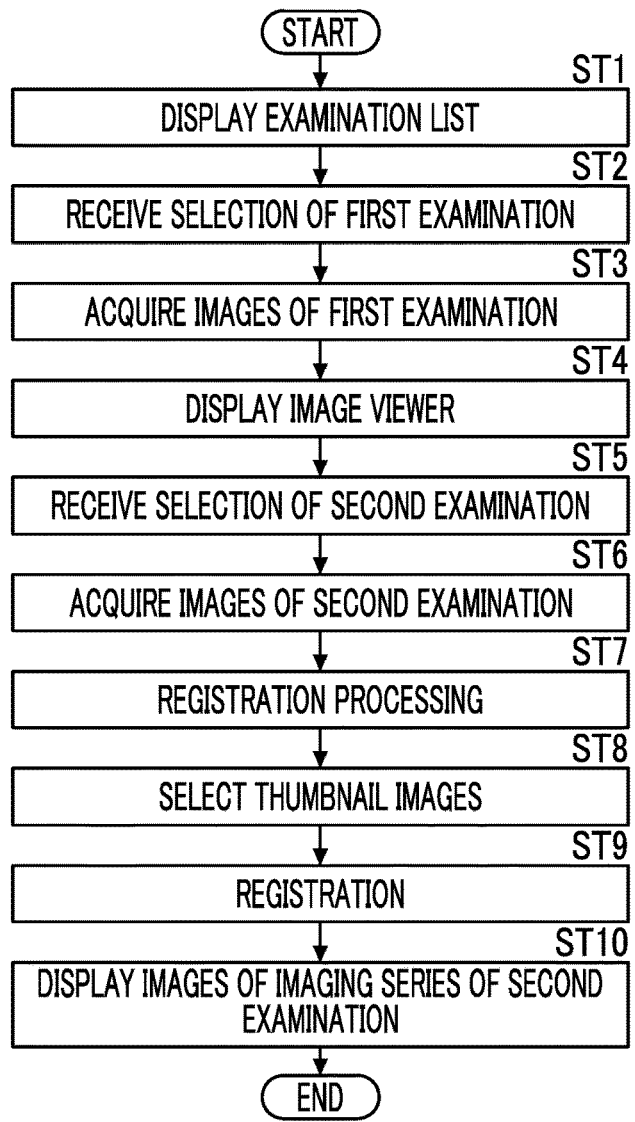

```
START
  ↓                                        ST1
DISPLAY EXAMINATION LIST
  ↓                                        ST2
RECEIVE SELECTION OF FIRST EXAMINATION
  ↓                                        ST3
ACQUIRE IMAGES OF FIRST EXAMINATION
  ↓                                        ST4
DISPLAY IMAGE VIEWER
  ↓                                        ST5
RECEIVE SELECTION OF SECOND EXAMINATION
  ↓                                        ST6
ACQUIRE IMAGES OF SECOND EXAMINATION
  ↓                                        ST7
REGISTRATION PROCESSING
  ↓                                        ST8
SELECT THUMBNAIL IMAGES
  ↓                                        ST9
REGISTRATION
  ↓                                        ST10
DISPLAY IMAGES OF IMAGING SERIES OF SECOND EXAMINATION
  ↓
END
```

FIG. 5

| PATIENT NAME | PATIENT ID | EXAMINATION DATE AND TIME | MODALITY | EXAMINATION ITEM |
|---|---|---|---|---|
| YS | AB1234 | 4/3/2017 | CT | ××× |
| NI | AC5678 | 6/3/2017 | MRI | ○○○ |
| RS | AD1372 | 8/11/2017 | CT | △△△ |
| NF | AE1965 | 9/4/2017 | CT | ××× |

L0

REGISTRATION APPARATUS, METHOD, AND PROGRAM

CROSS-REFERENCE TO RELATED APPLICATIONS

The present application claims priority under 35 U.S.C. § 119 to Japanese Patent Application No. 2017-185648, filed on Sep. 27, 2017, all of which are hereby expressly incorporated by reference into the present application.

BACKGROUND OF THE INVENTION

1. Field of the Invention

The present invention relates to a registration apparatus, method, and non-transitory computer readable recording medium storing program for registering three-dimensional images between two examinations including a plurality of imaging series including three-dimensional images each of which is configured to include a plurality of tomographic images.

2. Description of the Related Art

With an increase in the speed of image capturing apparatuses (modalities), such as computed tomography (CT) apparatuses and magnetic resonance imaging (MM) apparatuses, and an improvement in performance, such as multi-slice correspondence, it has become possible to acquire a three-dimensional image configured to include a plurality of tomographic images obtained by imaging a plurality of parts of a patient, which is a subject, in one imaging series. Therefore, since each part of the patient does not need to be imaged repeatedly and the total imaging time is shortened, the burden on the patient is reduced.

In the case of interpreting such three-dimensional images of CT, MM, and the like on the image viewer, the three-dimensional images are observed while sequentially switching and displaying tomographic images showing two-dimensional tomographic planes on the image viewer. At the time of interpretation, comparative interpretation between a plurality of three-dimensional images is performed in many cases. In this case, it is necessary to indicate a tomographic plane to be displayed for each three-dimensional image. However, each time a tomographic plane to be displayed is changed, the task of giving an instruction to make a change for each three-dimensional image is very troublesome.

For this reason, various methods for synchronizing the positions, that is, slice positions of tomographic planes in a three-dimensional image by analyzing the three-dimensional image have been proposed. For example, JP2014-525079A has proposed a method of matching slice positions by giving an anatomical tag to a position found in an image, performing spatial registration between an image of a new examination and an image of a past examination, and associating the anatomical tag with the image of the new examination and the image of the past examination. JP1996-103439A (JP-H08-103439A) has proposed a method in which, in the case of performing registration between three-dimensional images of the same subject captured in different examinations, an anatomical structure of the human body is extracted from each of a plurality of tomographic images included in the three-dimensional images, a relative positional deviation of the anatomical structure between the plurality of tomographic images is roughly registered based on the extraction result, and a relative positional deviation between the plurality of tomographic images is finely registered based on the plurality of roughly registered tomographic images.

SUMMARY OF THE INVENTION

On the other hand, in general, one examination (study) includes a plurality of imaging series, and one imaging series includes one or more images. Here, a three-dimensional image configured to include a plurality of tomographic images is included in one of the plurality of imaging series. Here, in the case of performing comparative interpretation between imaging series in the same examination, it is easy to synchronize the positions of tomographic planes of three-dimensional images included in the respective imaging series, that is, the slice positions, since the frame of reference (FOR) is the same. The FOR is identifying the positional relationship between the three-dimensional image and the subject and is recorded as an accessory information of the three-dimensional image. However, in the case of performing comparative interpretation between images included in different examinations, it is necessary to synchronize the slice positions using the methods described in JP2014-525079A and JP1996-103439A (JP-H08-103439A) since the frame of reference is different.

Here, one examination includes a plurality of imaging series. Therefore, in order to perform comparative interpretation between imaging series included in different examinations, it is necessary to register three-dimensional images in all combinations between imaging series included in different examinations. However, since each three-dimensional image is configured to include a plurality of tomographic images, the amount of calculation is significantly increased in order to match the slice positions of three-dimensional images in all combinations between imaging series included in different examinations. Accordingly, it takes a long time to perform registration.

The invention has been made in view of the aforementioned situation, and it is an object of the invention to enable high-speed registration between three-dimensional images included in imaging series included in different examinations.

A registration apparatus according to the invention comprises: an accessory information acquisition unit that acquires, from each of two different examinations including a plurality of imaging series including three-dimensional images each of which is configured to include a plurality of tomographic images, accessory information regarding the three-dimensional images; a series selection unit that selects one imaging series from each of the two examinations based on the accessory information; and a registration unit that performs registration between the three-dimensional images included in the imaging series of the two examinations based on images included in the selected imaging series and acquires a result of the registration as a registration result between the two examinations.

The "accessory information" does not mean a three-dimensional image itself but means accessory information regarding the three-dimensional image. As the accessory information, for example, the presence or absence of a scout image for positioning, the number of pixels in two directions of tomographic images forming a three-dimensional image, a pixel interval in two directions, an image direction, and an image position can be mentioned.

"A plurality of imaging series including three-dimensional images each of which is configured to include a plurality of tomographic images are included" may mean that all of a plurality of imaging series in one examination include a three-dimensional image configured to include a plurality of tomographic images or mean that only some of the plurality of imaging series in one examination includes a three-dimensional image configured to include a plurality of tomographic images. In the latter case, the plurality of imaging series includes, for example, an imaging series including only one image and an imaging series including one or more tomographic images reconstructed from a three-dimensional image. As one image, for example, a scout image for positioning at the time of imaging can be mentioned.

In the registration apparatus according to the invention, the accessory information acquisition unit may acquire the accessory information including scout image information, which indicates presence or absence of a scout image for positioning of an imaging position at the time of acquiring the three-dimensional image, in the imaging series included in each of the two examinations. In a case where the scout image information included in the accessory information in both the two examinations has a scout image, the series selection unit may select an imaging series including the scout image from each of the two examinations based on the accessory information, and the registration unit may perform the registration based on the scout image included in the selected imaging series.

In the registration apparatus according to the invention, in a case where the scout image information included in the accessory information in at least one of the two examinations has no scout image, the series selection unit may select the imaging series from each of the two examinations based on the accessory information other than the scout image information.

In the registration apparatus according to the invention, the accessory information acquisition unit may acquire the accessory information including information of tomographic planes of the tomographic images forming each of the three-dimensional images, and the series selection unit may select an imaging series including a three-dimensional image, in which the tomographic planes are axial cross sections, from each of the two examinations based on the accessory information.

In the registration apparatus according to the invention, the accessory information acquisition unit may further acquire the accessory information including information of a recording width in a direction perpendicular to the tomographic planes, and the series selection unit may select an imaging series having the smallest recording width from each of the two examinations based on the accessory information.

The "recording width" means a difference between the maximum value and the minimum value of coordinates where a tomographic image is present in a direction perpendicular to the tomographic planes of a plurality of tomographic images forming a three-dimensional image.

In the registration apparatus according to the invention, the accessory information acquisition unit may further acquire the accessory information including information of a recording width in a direction perpendicular to the tomographic planes, and the series selection unit may select an imaging series, in which a value indicating a difference in the recording width is less than a predetermined first threshold value, from each of the two examinations based on the accessory information.

The "value indicating the difference in recording width" may be any value as long as the value indicates a difference in recording width. For example, a difference between recording widths, a ratio between recording widths, and a value obtained by dividing the difference between recording widths by one recording width can be used.

In the registration apparatus according to the invention, the accessory information acquisition unit may acquire the accessory information including information of an effective visual field in each of the three-dimensional images, and the series selection unit may select an imaging series including a three-dimensional image, in which a value indicating a difference in the effective visual field is less than a predetermined second threshold value, from each of the two examinations based on the accessory information.

The "effective visual field" means the size of a tomographic image expressed by the horizontal and vertical lengths of each tomographic image forming a three-dimensional image. Specifically, in addition to the horizontal and vertical lengths of the tomographic image, the area of the tomographic image and the like can also be used as the effective visual field.

The "value indicating the difference in effective visual field" may be any value as long as the value indicates a difference in effective visual field. For example, a difference between effective visual fields, a ratio between effective visual fields, and a value obtained by dividing the difference between effective visual fields by one effective visual field can be used.

In the registration apparatus according to the invention, the accessory information acquisition unit may acquire the accessory information including information of an effective visual field in each of the three-dimensional images, and the series selection unit may select an imaging series including a three-dimensional image, in which the effective visual field is equal to or greater than a predetermined third threshold value, from each of the two examinations based on the accessory information.

In the registration apparatus according to the invention, the registration unit may determine whether or not the registration is successful. In a case where the registration fails, the series selection unit may further select an imaging series based on the accessory information, and the registration unit may perform registration between three-dimensional images included in the further selected imaging series.

In the registration apparatus according to the invention, the registration unit may acquire offset values in three directions in the three-dimensional images as the registration result.

A registration method according to the invention comprises: acquiring, from each of two different examinations including a plurality of imaging series including three-dimensional images each of which is configured to include a plurality of tomographic images, accessory information regarding the three-dimensional images; selecting one imaging series from each of the two examinations based on the accessory information; and performing registration between the three-dimensional images included in the imaging series of the two examinations based on images included in the selected imaging series and acquiring a result of the registration as a registration result between the two examinations.

In addition, a non-transitory computer readable recording medium storing a program causing a computer to execute the registration method according to the invention may be provided.

Another registration apparatus according to the invention comprises: a memory that stores commands to be executed by a computer; and a processor configured to execute the stored commands. The processor executes: processing for acquiring, from each of two different examinations including a plurality of imaging series including three-dimensional images each of which is configured to include a plurality of tomographic images, accessory information regarding the three-dimensional images; processing for selecting one imaging series from each of the two examinations based on the accessory information; and processing for performing registration between the three-dimensional images included in the imaging series of the two examinations based on images included in the selected imaging series and acquiring a result of the registration as a registration result between the two examinations.

According to the invention, accessory information regarding three-dimensional images is acquired from each of two examinations including a plurality of imaging series including three-dimensional images each of which is configured to include a plurality of tomographic images. Then, one imaging series is selected from each of the two examinations based on the accessory information, and registration between the three-dimensional images included in the imaging series of the two examinations is performed based on images included in the selected imaging series and a result of the registration is acquired as a registration result between the two examinations. For this reason, in order to match the slice positions of the images between the two examinations, it is not necessary to perform registration in all combinations between the imaging series included in different examinations. Therefore, it is possible to perform high-speed registration between three-dimensional images included in the imaging series included in different examinations.

BRIEF DESCRIPTION OF THE DRAWINGS

FIG. 4 is a flowchart showing a process performed in the present embodiment;

FIG. 5 is a diagram showing an examination list;

DESCRIPTION OF THE PREFERRED EMBODIMENTS

Figure 1:
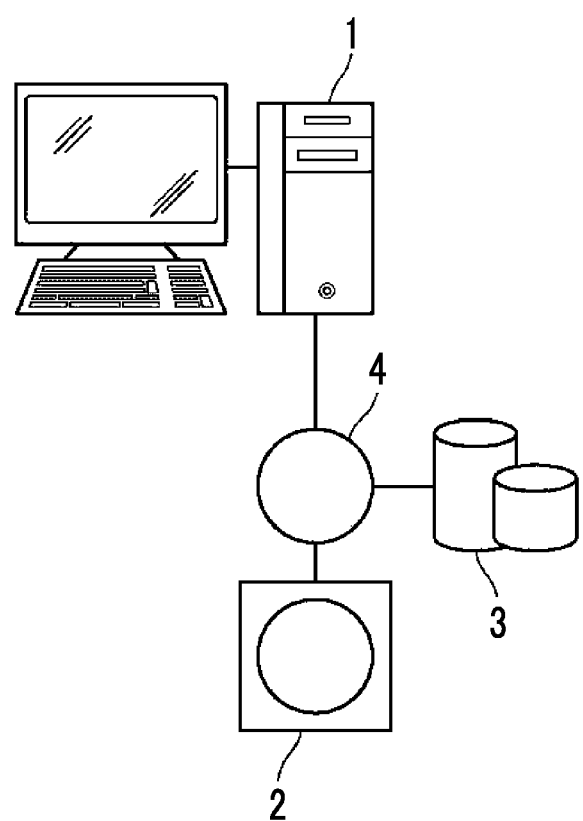
FIG. 1 is a hardware configuration diagram showing an outline of a diagnostic support system to which a registration apparatus according to an embodiment of the invention is applied.

Hereinafter, an embodiment of the invention will be described with reference to the accompanying diagrams. FIG. 1 is a hardware configuration diagram showing the outline of a diagnostic support system to which a registration apparatus according to an embodiment of the invention is applied. As shown in FIG. 1, in the diagnostic support system, a registration apparatus 1 according to the present embodiment, a three-dimensional image capturing apparatus 2, and an image storage server 3 are communicably connected to each other through a network 4.

Here, one examination on a subject generally includes a plurality of imaging series, and one imaging series includes one or more images. Since the plurality of imaging series acquired in one examination have the same frame of reference (FOR), it is easy to display the slice positions of the three-dimensional images synchronously for comparative diagnosis between the imaging series. However, since the frame of reference is different in a case where the examination is different, it is necessary to perform registration in order to synchronize the slice positions of the three-dimensional images between imaging series in different examinations. In the diagnostic support system of the present embodiment, in order to perform comparative diagnosis using images acquired in two examinations performed on the subject at different times, three-dimensional images included in the two examinations are registered, and the registration result is acquired as a registration result between the two examinations.

The three-dimensional image capturing apparatus 2 is an apparatus that generates a three-dimensional image showing a part, which is a part to be examined of a subject, by imaging the part. Specifically, the three-dimensional image capturing apparatus 2 is a CT apparatus, an MRI apparatus, a positron emission tomography (PET) apparatus, or the like. In the present embodiment, one examination on the subject includes a plurality of imaging series. In the imaging series, the type of the image (CT image, MRI image, or the like), an imaging range (chest, abdomen, or the like), and the like are defined, and at least one image is acquired in each of the imaging series. For example, in one imaging series, a three-dimensional image configured to include a plurality of tomographic images acquired by imaging a target part of the subject by the three-dimensional image capturing apparatus 2 is included. In the three-dimensional image capturing apparatus 2, one scout image acquired for positioning of the subject may be included in one imaging series. One or more tomographic images acquired by reconstructing the three-dimensional image acquired by the three-dimensional image capturing apparatus 2 may be included in one imaging series.

The image storage server 3 is a computer that stores and manages various kinds of data, and includes a large-capacity external storage device and software for database management. The image storage server 3 communicates with other devices through the wired or wireless network 4 to transmit and receive image data or the like. Specifically, the image storage server 3 acquires image data, such as a three-dimensional image generated by the three-dimensional image capturing apparatus 2, through the network, and stores the image data in a recording medium, such as a large-capacity external storage device, to manage the image data. The storage format of image data and the communication between devices through the network 4 is based on a protocol, such as a digital imaging and communication in medicine (DICOM). In the present embodiment, it is assumed that images of a plurality of imaging series are stored in the image storage server 3 for each of a plurality of examinations performed on the same subject at different times. In addition, in the present embodiment, it is assumed that information regarding an examination, in which stored images have been acquired, is stored in the image storage server 3 as an examination list. The examination list will be described later.

The registration apparatus 1 is realized by installing a registration program of the invention on one computer. The computer may be a workstation or a personal computer that is directly operated by a doctor who performs diagnosis, or may be a server computer connected to these through a network. The image display program is distributed by being recorded on a recording medium, such as a digital versatile disc (DVD) or a compact disc read only memory (CD-ROM), and is installed onto the computer from the recording medium. Alternatively, the image display program is stored in a storage device of a server computer connected to the network or in a network storage so as to be accessible from the outside, and is downloaded and installed onto a computer used by a doctor as necessary.

Figure 2:
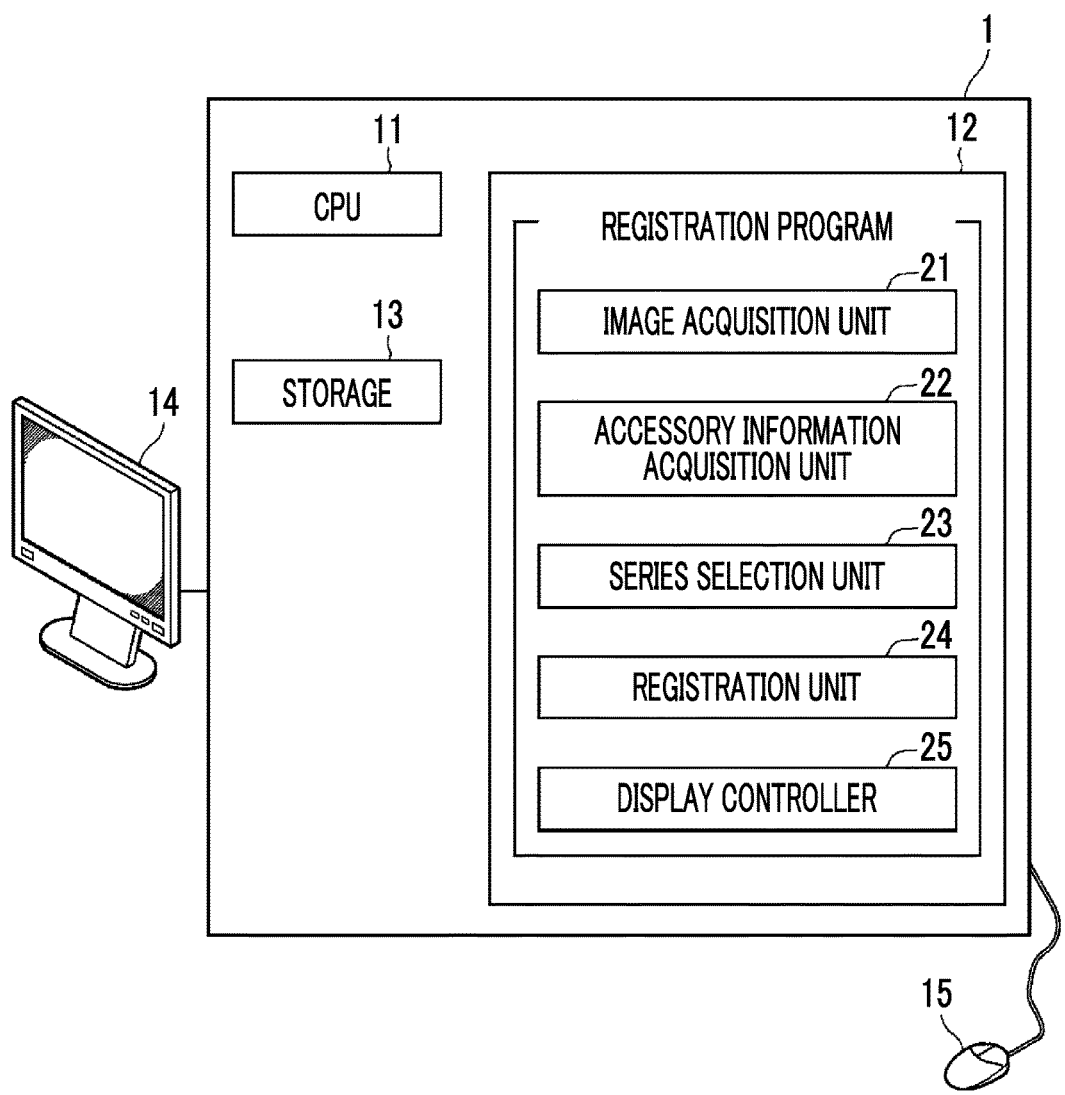
FIG. 2 is a schematic block diagram showing the configuration of the registration apparatus according to the present embodiment.

FIG. 2 is a diagram showing the schematic configuration of a registration apparatus realized by installing a registration program on a computer. As shown in FIG. 2, the registration apparatus 1 includes a central processing unit (CPU) 11, a memory 12, and a storage 13 as the configuration of a standard workstation. A display 14, such as a liquid crystal display, and an input unit 15, such as a keyboard and a mouse, are connected to the registration apparatus 1.

The storage 13 is a storage device, such as a hard disk or a solid state drive (SSD). Images of the subject and various kinds of information including information required for processing, which are acquired from the image storage server 3 through the network 4, are stored in the storage 13.

The registration program is stored in the memory 12. As processing to be executed by the CPU 11, the registration program defines: image acquisition processing for acquiring images acquired by two examinations in order to perform comparative diagnosis; accessory information acquisition processing for acquiring accessory information regarding a three-dimensional image from each of the above two examinations; series selection processing for selecting one imaging series from each of the two examinations based on the accessory information; registration processing for performing registration between three-dimensional images included in the imaging series of the two examinations based on images included in the selected imaging series and acquiring the registration result as a registration result between the two examinations; and display control processing for registering and displaying the images included in the imaging series in the two examinations based on the registration result.

The CPU 11 executes these processes according to the program, so that the computer functions as an image acquisition unit 21, an accessory information acquisition unit 22, a series selection unit 23, a registration unit 24, and a display controller 25. In the present embodiment, the function of each unit is executed by the registration program, but the present invention is not limited thereto. For example, the function of each unit may be executed by appropriately combining a plurality of integrated circuits (ICs), processors, application specific integrated circuits (ASICs), field-programmable gate arrays (FPGAs), memories, and the like.

The image acquisition unit 21 acquires an examination list stored in the image storage server 3 in response to an operator's instruction from the input unit 15, and acquires images acquired by two examinations selected by the operator, from the image storage server 3, based on the examination list displayed on the display 14 as will be described later. Each examination includes a plurality of imaging series including a three-dimensional image configured to include a plurality of tomographic images. In a case where images of the imaging series included in two examinations are already stored in the storage 13, the image acquisition unit 21 may acquire the images from the storage 13. Hereinafter, the two examinations will be referred to as a first examination and a second examination.

The accessory information acquisition unit 22 acquires accessory information F1 and F2 regarding the three-dimensional image from the first and second examinations. Here, the accessory information does not mean a three-dimensional image itself but means accessory information regarding the three-dimensional image. The accessory information includes scout image information indicating the presence or absence of a scout image for positioning in each imaging series, the number of pixels in two directions of tomographic images forming a three-dimensional image, a pixel interval in two directions, an image direction and an image position, and information of the recording width and the effective visual field acquired from the number of pixels, the pixel interval, and the like. The accessory information may include an imaging part.

The scout image is an image acquired for positioning of the subject before capturing a three-dimensional image. The number of pixels in two directions of tomographic images forming the three-dimensional image is the number of pixels in each of the horizontal direction and the vertical direction in the tomographic images. The pixel interval in two directions in the tomographic image is the size (for example, 0.1 mm×0.1 mm) of an image expressed by one pixel in the tomographic image. The image position of the tomographic image is a position at which the subject is imaged. For example, the image position of the tomographic image is a coordinate value of the upper left corner of the tomographic image in the three-dimensional space of the three-dimensional image. The image direction of the tomographic image is a vector representing the direction of the tomographic plane of the tomographic image. Based on the image direction, it is possible to determine whether the tomographic plane of the tomographic image is, for example, an axial cross section, a sagittal cross section, or a coronal cross section.

For example, in a case where the tomographic plane of the tomographic image is an axial cross section, the recording width is acquired as, for example, a value of 50 cm by calculating the difference between the maximum value and the minimum value of the z coordinate of the image position of the tomographic image forming the three-dimensional image. In addition, for example, in a case where the tomographic plane of the tomographic image is an axial cross section, the effective visual field is acquired as, for example, a value of 30 cm×30 cm by multiplying the number of pixels in each of the horizontal and vertical directions in the tomographic image by the pixel interval. The area of the tomographic image may be used as the effective visual field.

The accessory information is stored as, for example, text information in units of examination or imaging series unit, or is described as header information of DICOM in the image. In a case where the accessory information is stored as text information, the accessory information acquisition unit 22 acquires the text information as accessory information. In a case where the accessory information is described in the header of the image, the accessory information is acquired by reading the information described in the header. The accessory information acquisition unit 22 acquires the recording width and the effective visual field by calculation from the image position and the number of pixels and the pixel interval in two directions of tomographic images forming the three-dimensional image.

The series selection unit 23 selects one imaging series from each of the two examinations based on the accessory information F1 and F2. In the present embodiment, first, the series selection unit 23 determines whether or not an imaging series including a scout image is included in the imaging series included in each of the two examinations with reference to scout image information indicating the presence or absence of the scout image included in the accessory information F1 and F2. In a case where both the two examinations include imaging series including a scout image, the series selection unit 23 selects an imaging series including the scout image from each of the two examinations based on the accessory information F1 and F2.

The scout image is an image used for positioning of the subject in the case of acquiring the three-dimensional image, and is acquired by imaging the subject from the front or the side. Usually, only one scout image is acquired in one examination. However, for example, as in a case where both the front image and the side image are used as scout images, a plurality of imaging series including a scout image may be included in one examination. Here, the header of the scout image includes information of the imaging direction. Therefore, in a case where a plurality of imaging series including a scout image are included in one examination, the series selection unit 23 may select a scout image having the same imaging direction (for example, the front and the side) with reference to the header of the scout image. The series selection unit 23 may also select an imaging series including a scout image with the latest imaging date and time.

On the other hand, in a case where an imaging series including a scout image is not included in at least one of the two examinations, the series selection unit 23 selects an imaging series using information other than the scout image information included in the accessory information F1 and F2. For example, based on the information of the image direction of the tomographic image forming the three-dimensional image, which is included in the accessory information F1 and F2, an imaging series including a three-dimensional image in which tomographic planes are axial cross sections is selected from each of the two examinations. The information of the image direction is included in the accessory information F1 and F2 as a vector representing the direction of the tomographic plane of the tomographic image. The direction of the tomographic plane of the tomographic image does not need to be strictly the axial direction, and may be a direction substantially regarded as the axial direction. Here, the tomographic image of the axial cross section is the most general image in the three-dimensional image. Therefore, by acquiring the accessory information F1 and F2 including the image direction of the tomographic image forming the three-dimensional image and selecting the imaging series including the three-dimensional image, in which tomographic planes are axial cross sections, from each of the two examinations based on the accessory information F1 and F2, it is possible to perform registration between examinations of a wide variety of examination types.

In a case where a plurality of imaging series including a three-dimensional image in which tomographic planes are axial cross sections are included in one examination, for example, an imaging series including a three-dimensional image with the latest imaging date and time may be selected. The imaging series may be sorted in ascending order of the recording width based on the information of the recording width included in the accessory information F1 and F2, and an imaging series having the smallest recording width may be selected from each of the two examinations. In this case, in a case where registration fails as will be described later and it is necessary to further select an imaging series, an imaging series may be selected in ascending order of the recording width.

In a case where the recording width in a direction perpendicular to the tomographic plane in the three-dimensional image is small, there is a high possibility that a specific part as a target will be imaged. In the three-dimensional image including such a specific part, it is easy to match the slice positions with each other. Therefore, by selecting an imaging series having the smallest recording width from each of the two examinations based on the information of the recording width in a direction perpendicular to the tomographic plane, it is possible to quickly and easily register three-dimensional images included in imaging series included in different examinations.

In a case where a plurality of imaging series including a three-dimensional image in which tomographic planes are axial cross sections are included in one examination, an imaging series in which a value indicating the difference in recording width is less than a predetermined first threshold value Th1 may be selected from each of the two examinations based on the information of the recording width included in the accessory information F1 and F2. As the value indicating the difference in recording width, it is possible to use a difference between recording widths, a ratio between recording widths, a value obtained by dividing the difference between recording widths by one recording width, and the like. In a case where the difference between recording widths is used as a value indicating the difference in recording width, for example, a value of ±20% of the recording width in one examination can be used as the first threshold value Th1.

In a case where the difference in recording width in a direction perpendicular to each tomographic plane in three-dimensional images included in two imaging series is small, the three-dimensional images included in the two imaging series are highly likely to be acquired by imaging a specific part as a target. In the three-dimensional image including such a specific part, it is easy to match the slice positions with each other. Therefore, by further acquiring the accessory information F1 and F2 including the information of the recording width in the direction perpendicular to the tomographic plane and selecting an imaging series, in which the value indicating the difference in recording width is less than the predetermined first threshold value Th1, from each of the two examinations based on the accessory information F1 and F2, it is possible to quickly and easily register three-dimensional images included in imaging series included in different examinations.

In a case where a plurality of imaging series including a three-dimensional image in which tomographic planes are axial cross sections are included in one examination, an imaging series in which a value indicating the difference in effective visual field is less than a predetermined second threshold value Th2 may be selected from each of the two examinations based on the information of the effective visual field included in the accessory information F1 and F2. As the value indicating the difference in effective visual field, it is possible to use a difference between the horizontal and vertical lengths of the effective visual field, a ratio between the horizontal and vertical lengths of the effective visual field, a value obtained by dividing the difference between the horizontal and vertical lengths of one effective visual field by the horizontal and vertical lengths of the other effective visual field, and the like. In a case where the difference between effective visual fields is used as a value indicating the difference in effective visual field, for example, a value of ±50% of the vertical or horizontal length of the effective visual field in one examination can be used as the second threshold value Th2.

Here, since three-dimensional images included in imaging series in which the effective visual field is largely different are likely to include different parts, the three-dimensional images are not suitable for registration. Conversely, since three-dimensional images included in imaging series in which the difference in effective visual field is small are likely to include the same part, it is easy to perform registration between the three-dimensional images. Therefore, by acquiring the accessory information F1 and F2 including the information of the effective visual field in three-dimensional images and selecting an imaging series including a three-dimensional image, in which the value indicating the difference in effective visual field is less than the predetermined second threshold value Th2, from each of the two examinations based on the accessory information F1 and F2, it is possible to quickly and easily register three-dimensional images included in imaging series included in different examinations.

In a case where a plurality of imaging series including a three-dimensional image in which tomographic planes are axial cross sections are included in one examination, the accessory information F1 and F2 including the information of the effective visual field in the three-dimensional image may be acquired, and an imaging series including a three-dimensional image in which the effective visual field is equal to or greater than a predetermined third threshold value Th3 may be selected from each of the two examinations based on the accessory information F1 and F2. As the third threshold value Th3, for example, 30 cm can be used for each of the horizontal and vertical directions. In an imaging series with a large effective visual field, the amount of information included in the three-dimensional image is large. Therefore, it is easy to perform registration in many cases. Therefore, by acquiring the accessory information F1 and F2 including the information of the effective visual field in three-dimensional images and selecting an imaging series including a three-dimensional image, in which the effective visual field is equal to or greater than the predetermined third threshold value Th3, from each of the two examinations based on the accessory information F1 and F2, it is possible to quickly and easily register three-dimensional images included in imaging series included in different examinations.

The imaging series may be sorted in descending order of the effective visual field based on the information of the effective visual field included in the accessory information F1 and F2, and the imaging series having the largest effective visual field may be selected from each of the two examinations. In this case, in a case where registration fails as will be described later and it is necessary to further select an imaging series, an imaging series may be selected in descending order of the effective visual field.

The series selection unit 23 may select an imaging series by combining the recording width, the difference in recording width, the size of the effective visual field, and the difference in effective visual field. For example, imaging series may be selected in which the effective visual field is equal to or greater than the third threshold value Th3, the value indicating the difference between the effective visual fields of two imaging series is less than the second threshold value Th2, and the value indicating the difference in recording width is less than the first threshold value Th1. Alternatively, imaging series may be selected in which the effective visual field is equal to or greater than the third threshold value Th3 and the value indicating the difference between the effective visual fields of two imaging series is less than the second threshold value Th2. Alternatively, imaging series may be selected in which the value indicating the difference between the effective visual fields of two imaging series is less than the second threshold value Th2 and the value indicating the difference in recording width is less than the first threshold value Th1.

The registration unit 24 performs registration between three-dimensional images included in the respective imaging series of two examinations based on the imaging series selected from the two examinations by the series selection unit 23. In a case where an imaging series including a scout image is selected, the registration unit 24 performs registration between the three-dimensional images included in the imaging series of two examinations based on the scout image, and acquires the result of the registration as a registration result between the two examinations.

In order to acquire the registration result, the registration unit 24 performs registration between scout images. Since a scout image is a two-dimensional image, registration between scout images is performed by template matching. That is, in a case where a correlation between scout images is maximized by parallel movement and rotational movement therebetween, the amount of parallel movement and the amount of rotational movement of one scout image with respect to the other scout image are calculated.

Figure 3:
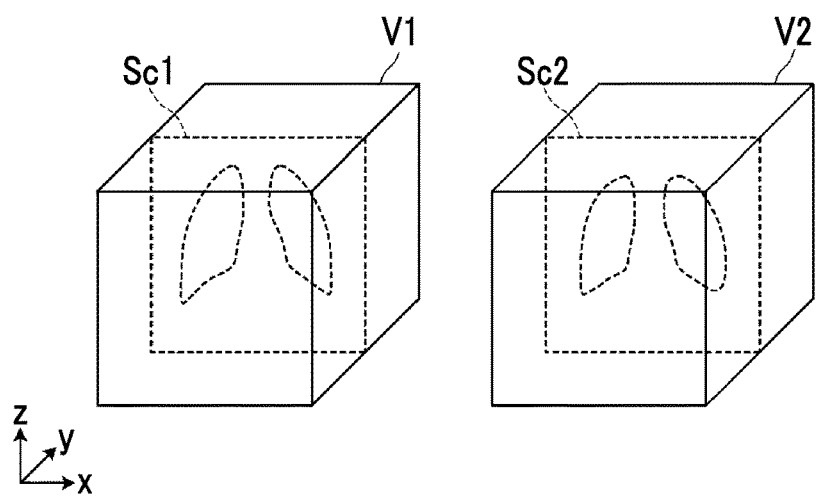
FIG. 3 is a diagram illustrating the registration between scout images.

FIG. 3 is a diagram illustrating the registration between scout images. FIG. 3 shows three-dimensional images V1 and V2 of the chest that are acquired in first and second examinations, respectively, and are configured to include tomographic images of a plurality of axial cross sections. It is assumed that scout images Sc1 and Sc2 are images obtained by imaging the front of the chest. As shown in FIG. 3, in the three-dimensional images V1 and V2, the scout images Sc1 and Sc2 are located on the xz plane. By performing registration between the scout images Sc1 and Sc2, the amount of parallel movement and the amount of rotational movement of one scout image with respect to the other scout image are calculated.

In the present embodiment, in order to simplify the registration, only the amount of parallel movement is used. The calculated amount of parallel movement corresponds to a difference between the position in the x direction and the position in the z direction between the three-dimensional image V1 and the three-dimensional image V2. For the y direction, the difference between the coordinate values of the scout images Sc1 and Sc2 in the y direction, which are described in the respective headers of the scout images Sc1 and Sc2, corresponds to a position difference in the y direction. Therefore, performing the registration between the scout images Sc1 and Sc2 corresponds to performing registration between three-dimensional images included the imaging series of two examinations. The registration unit 24 acquires the differences between the scout images Sc1 and Sc2 in the x, y, and z directions, that is, offset values in the three directions, as the registration result between the two examinations.

On the other hand, in a case where an imaging series other than the imaging series including a scout image is selected from each of the two examinations, the registration unit 24 performs registration using three-dimensional images included in the selected imaging series, and acquires the result of the registration as a registration result between the two examinations. For the registration using the three-dimensional images, the methods described in JP2014-525079A and JP1996-103439A (JP-H08-103439A) can be used. Alternatively, a method may be used in which a similarity between combinations of a tomographic image (referred to as D1) included in the three-dimensional image V1 in the first examination and a tomographic image (referred to as D2) included in the three-dimensional image V2 in the second examination is calculated, an adjustment value of the similarity is acquired based on the positional relationship between the cross-sectional positions of the tomographic image D1 and the positional relationship between the cross-sectional positions of the tomographic image D2, and the tomographic image D1 and the tomographic image D2 are associated with each other based on the sum of all similarities and all adjustment values.

The display controller 25 displays the registered three-dimensional image. The display controller 25 displays an image viewer on the display 14 to display the three-dimensional image. The display controller 25 displays the image viewer and the operator's instruction on the displayed image viewer is input from the input unit 15 to the registration apparatus 1, so that the image acquisition unit 21, the accessory information acquisition unit 22, the series selection unit 23, and the registration unit 24 perform the processing described above.

Next, a process performed in the present embodiment will be described. FIG. 4 is a flowchart showing the process performed in the present embodiment. In a case where an operator inputs an instruction to display an examination list through the input unit 15, the image acquisition unit 21 acquires an examination list from the image storage server 3, and the display controller 25 displays the examination list on the display 14 (step ST1). FIG. 5 is a diagram showing an examination list. As shown in FIG. 5, an examination list L0 includes a patient name, a patient ID, an examination date and time, a modality, and an examination item. The operator selects an examination for performing comparative interpretation from the examination list L0 displayed on the display 14.

First, the operator selects a first examination for comparative interpretation. Therefore, the image acquisition unit 21 receives the selection of the first examination through the input unit 15 (step ST2). In a case where the first examination is selected, the image acquisition unit 21 acquires images of the first examination from the image storage server 3 (step ST3). Then, the display controller 25 displays an image viewer on the display 14 (step ST4).

Figure 6:
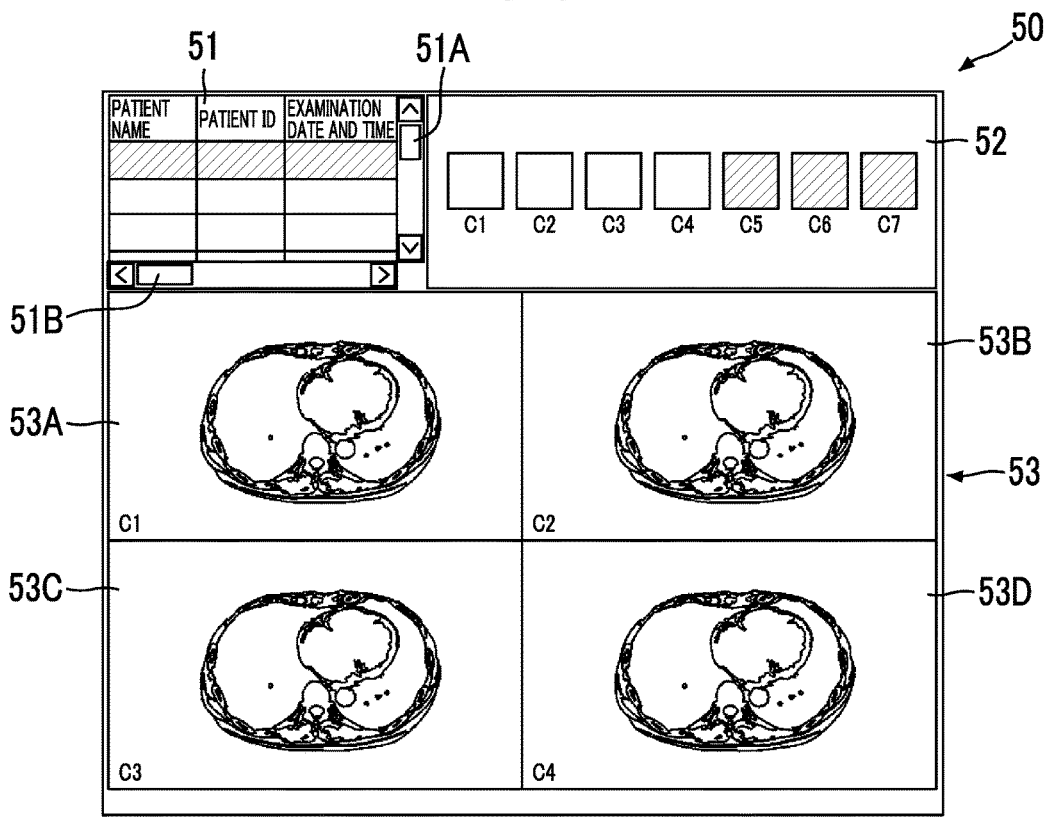
FIG. 6 is a diagram showing an image viewer.

FIG. 6 is a diagram showing an image viewer. As shown in FIG. 6, an image viewer 50 includes an examination list area 51 for displaying the examination list, a thumbnail image area 52 for displaying thumbnail images of the imaging series included in the first examination, and an image display area 53 for displaying images of the selected imaging series.

Since all examination lists cannot be displayed at a time in the examination list area 51, scroll bars 51A and 51B are displayed. By operating the scroll bars 51A and 51B, the operator can display a desired examination list and a desired item in the examination list. In FIG. 6, an examination (here, the first examination) selected in the examination list area 51 is hatched.

In the thumbnail image area 52, thumbnail images of representative images of one or more images included in the imaging series of the first examination are displayed. Here, assuming that seven imaging series are included in the selected first examination, thumbnail images of representative images of the seven imaging series are displayed in the thumbnail image area 52 as shown in FIG. 5. The representative image is a tomographic image of a predetermined tomographic plane included in the three-dimensional image of each imaging series. Below the respective thumbnail images, codes C1 to C7 indicating the imaging series are given.

In the image display area 53, images of the imaging series selected in the thumbnail image area 52 are displayed. The image display area 53 includes four display areas 53A to 53D. In FIG. 6, representative images of four imaging series C1 to C4 selected from the seven imaging series C1 to C7 are displayed in the display areas 53A to 53D of the image display area 53, respectively. In the thumbnail image area 52, thumbnail images of the imaging series C5 to C7 other than the imaging series C1 to C4 displayed in the image display area 53 are hatched in order to clearly indicate that the thumbnail images of the imaging series C5 to C7 are not displayed in the image display area 53.

In the imaging series included in one examination, since the frame of reference is the same, it is easy to synchronize the slice positions between the imaging series. Therefore, the slice positions of the representative images of the four imaging series displayed in the image display area 53 are synchronized to become tomographic images of the same slice position in the subject.

Figure 7:
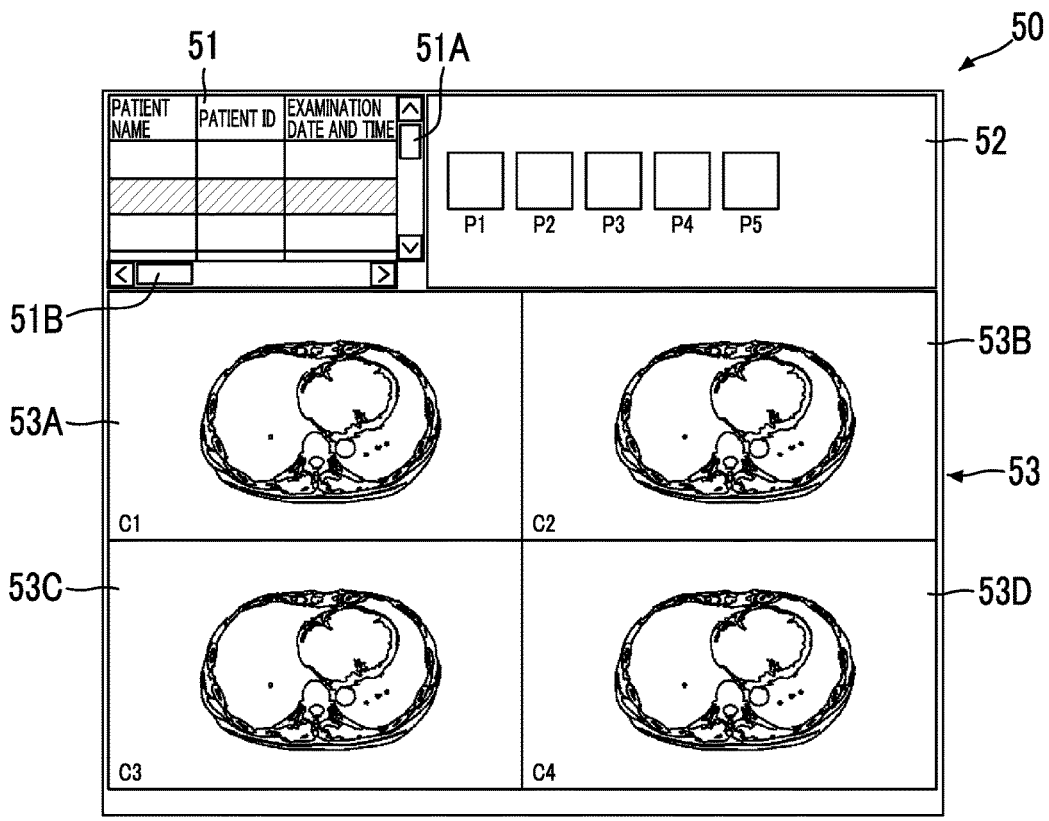
FIG. 7 is a diagram showing a state in which a second examination is selected in the image viewer.

Then, the operator selects a second examination with reference to the examination list area 51. Therefore, the image acquisition unit 21 receives the selection of the second examination through the input unit 15 (step ST5). In a case where the second examination is selected, the image acquisition unit 21 acquires images of the second examination from the image storage server 3 (step ST6). In a case where the images of the second examination are acquired, thumbnail images of representative images of one or more images included in the imaging series of the second examination are displayed in the thumbnail image area 52 as shown in FIG. 7. In addition, as shown in FIG. 7, the second examination includes five imaging series P1 to P5, and five thumbnail images of the five imaging series P1 to P5 are displayed in the thumbnail image area 52. In a case where the images of the second examination are acquired, registration processing is executed in the background (step ST7).

Figure 8:
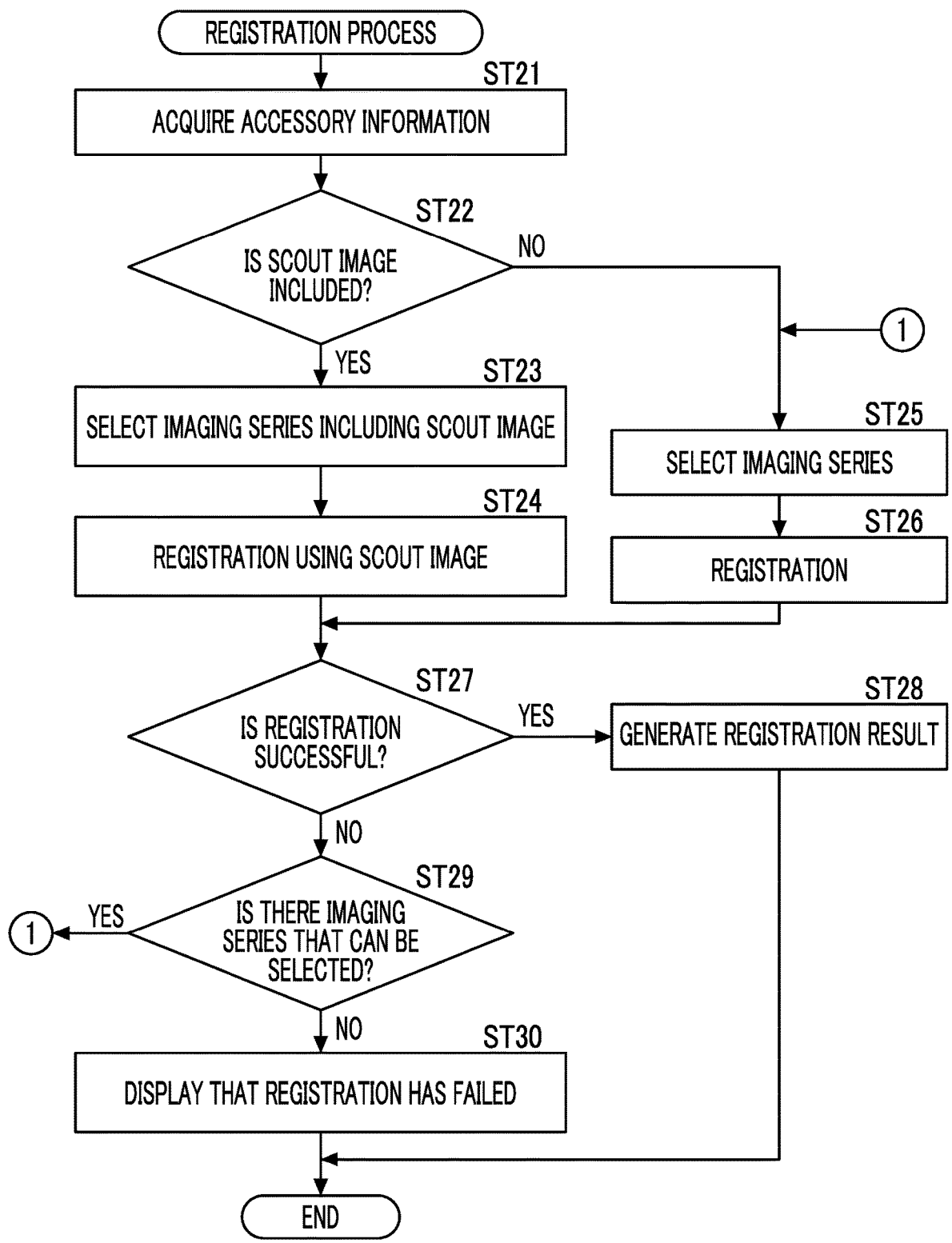
FIG. 8 is a flowchart of registration processing.

FIG. 8 is a flowchart of registration processing. In a case where images of the second examination are acquired, the accessory information acquisition unit 22 acquires the accessory information F1 and F2 regarding the three-dimensional image from the first and second examinations (step ST21). Then, the series selection unit 23 determines whether or not both the two examinations include imaging series including a scout image with reference to the scout image information included in the accessory information F1 and F2 (step ST22).

In a case where both the two examinations include a scout image (step ST22: positive), the series selection unit 23 selects an imaging series including the scout image from each of the two examinations (step ST23). Then, the registration unit 24 performs registration between three-dimensional images included in the imaging series of the two examinations using the scout image (step ST24).

In a case where at least one of the two examinations does not include a scout image (step ST22: negative), the series selection unit 23 selects an imaging series using information other than the scout image information included in the accessory information F1 and F2 (step ST25). Then, the registration unit 24 performs registration between three-dimensional images included in the imaging series selected from the two examinations (step ST26).

Here, there is a case where registration fails for some reason, such as a case where the correlation value or the similarity in the registration processing is smaller than a predetermined threshold value. For this reason, the registration unit 24 determines whether or not the registration is successful (step ST27). In a case where the registration is successful (step ST27: positive), the registration unit 24 generates the offset values in the three directions calculated as described above as a registration result (step ST28), and ends the process.

In a case where registration fails (step ST27: negative), the series selection unit 23 determines whether or not an imaging series that can be further selected is included in the two examinations (whether or not there is an imaging series that can be selected; step ST29). That is, it is determined whether or not the combination of imaging series for which registration processing has not yet been performed is included in the two examinations. In a case where step ST29 is positive, the process returns to step ST25. In a case where step ST29 is negative, since an imaging series that can be selected is not included in one examination any more, it is not possible to perform further registration processing. Therefore, the display controller 25 displays on the display 14 information indicating that the registration has failed (step ST30), and ends the registration process.

Returning to the flowchart shown in FIG. 4, the operator selects thumbnail images to be displayed in the thumbnail image area 52 of the image viewer and drags and drops the selected thumbnail images in the image display area 53 (step ST8). The registration unit 24 performs registration between a three-dimensional image included in the selected imaging series and a three-dimensional image included in the imaging series of the first examination based on the registration result (step ST9), displays representative images of the selected imaging series in the image display area 53 (step ST10), and ends the process.

Figure 9:
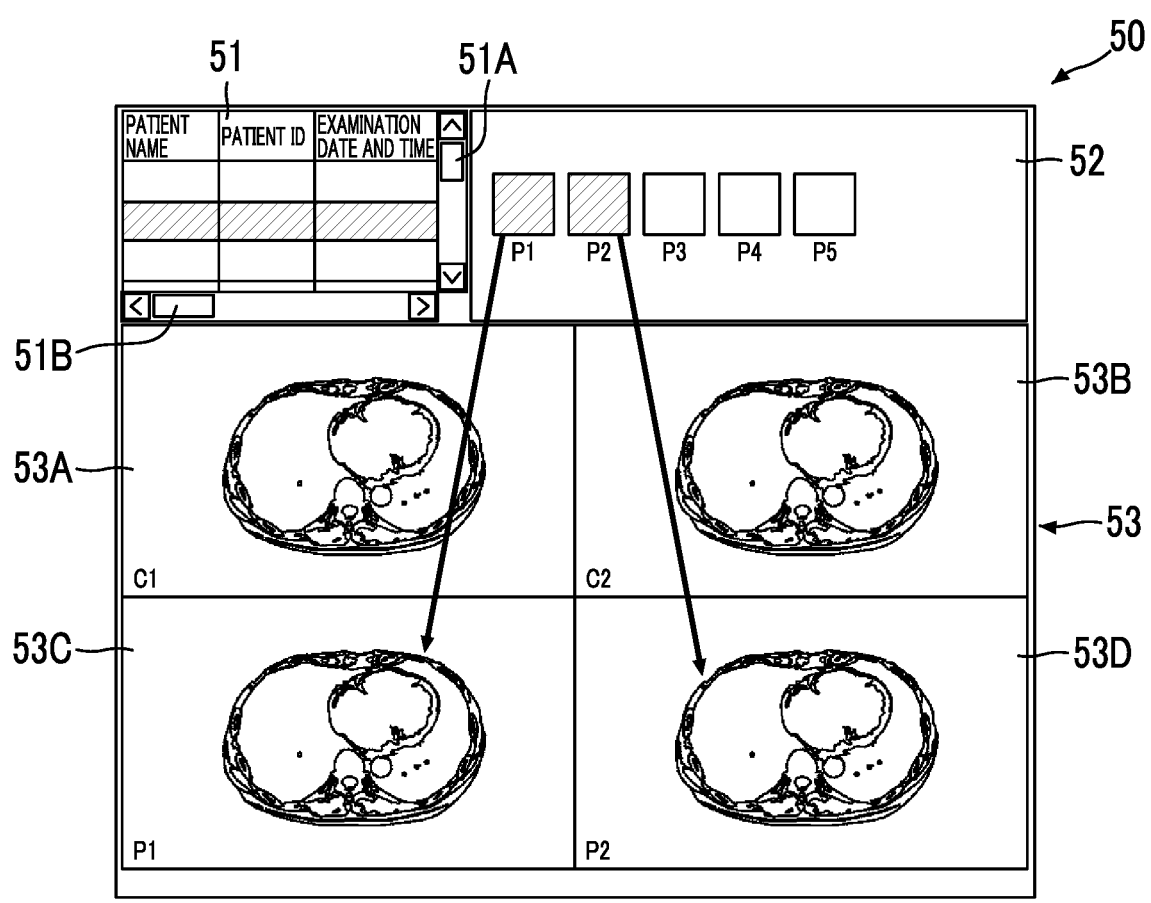
FIG. 9 is a diagram showing a state in which an imaging series in a second examination is selected in the image viewer.

For example, as shown in FIG. 9, in a case where the operator drags and drops a thumbnail image of the imaging series P1 to a display area 53C of the image display area 53, the representative image of the imaging series P1 is displayed in the display area 53C. In addition, in a case where the operator drags and drops a thumbnail image of the imaging series P2 to a display area 53D of the image display area 53, the representative image of the imaging series P2 is displayed in the display area 53D. In this case, based on the registration result, registration between the imaging series selected in the second examination and the imaging series in the first examination is performed. Therefore, the representative images of the imaging series P1 and P2 displayed in the image display area 53 are tomographic images of the same slice position as the representative images of the imaging series C1 and C2 in the first examination. The positions in the two-dimensional directions on the display areas 53A to 53D are also almost the same.

In this state, in a case where the slice positions of the tomographic images displayed in the image display area 53 are changed using the input unit 15, specifically, using a mouse wheel in a case where the input unit 15 has a mouse, the slice positions in four images displayed in the image display area 53 are synchronized, and the tomographic images of the same slice position are switched and displayed.

As described above, in the present embodiment, the accessory information F1 and F2 regarding three-dimensional images are acquired from the two examinations including a plurality of imaging series including three-dimensional images each of which is configured to include a plurality of tomographic images, one imaging series is selected from each of the two examinations based on the accessory information F1 and F2, registration between the three-dimensional images included in the imaging series of the two examinations is performed based on images included in the selected imaging series, and the registration result is acquired as a registration result between the two examinations. For this reason, in order to match the slice positions of the images between the two examinations, it is not necessary to perform registration in all combinations between the imaging series included in different examinations. Therefore, it is possible to perform high-speed registration between three-dimensional images included in the imaging series included in different examinations.

In the embodiment described above, an image viewer program for displaying a three-dimensional image is installed on a computer as a part of the registration program, thereby configuring the registration apparatus 1. However, the image viewer program may be installed on a computer separately from the registration program.

In the embodiment described above, registration between the first and second examinations is performed. On the other hand, registration between the second examination and the third examination different from the first examination can also be performed in the same manner as in the embodiment described above. In this case, it is also possible to perform registration between the first and third examinations using the registration result between the first and second examinations and the registration result between the second and third examinations. That is, in a case where the registration result between the first and second examinations is (x1, y1, z1) and the registration result between the second and third examinations is (x2, y2, z2), the registration result between the first and third examinations can be calculated as (x1+x2, y1+y2, z1+z2).

In the embodiment described above, the presence or absence of a scout image is determined first, and information other than the scout image information is used in a case where the determination is negative. However, an imaging series may be selected using information other than the scout image information, that is, information of the recording width, the difference in recording width, the size of the effective visual field, and the difference in effective visual field, without determining the presence or absence of a scout image.

Hereinafter, the effect of the present embodiment will be described.

By acquiring the information indicating the presence or absence of a scout image as accessory information, selecting the imaging series including a scout image from each of the two examinations based on the accessory information, and performing registration based on the scout image, it is possible to perform registration using one image called a scout image. Therefore, it is possible to perform registration between three-dimensional images included in the imaging series included in different examinations at a higher speed.

The tomographic image of the axial cross section is the most general image in the three-dimensional image. Therefore, by acquiring the accessory information including the information of the tomographic planes of the tomographic images forming the three-dimensional image and selecting the imaging series including the three-dimensional image, in which the tomographic planes are axial cross sections, from each of the two examinations based on the accessory information, it is possible to perform registration between examinations of a wide variety of examination types.

In a case where the recording width in a direction perpendicular to the tomographic plane in the three-dimensional image is small, there is a high possibility that a specific part as a target will be imaged. In the three-dimensional image including such a specific part, it is easy to match the slice positions with each other. Therefore, by further acquiring accessory information including the information of the recording width in a direction perpendicular to the tomographic plane and selecting an imaging series having the smallest recording width from each of the two examinations based on the accessory information, it is possible to quickly and easily register three-dimensional images included in imaging series included in different examinations.

In a case where the difference in recording width in a direction perpendicular to each tomographic plane in three-dimensional images included in two imaging series is small, the three-dimensional images included in the two imaging series are highly likely to be acquired by imaging a specific part as a target. In the three-dimensional image including such a specific part, it is easy to match the slice positions with each other. Therefore, by further acquiring the accessory information including the information of the recording width in the direction perpendicular to the tomographic plane and selecting an imaging series, in which the value indicating the difference in recording width is less than the predetermined first threshold value, from each of the two examinations based on the accessory information, it is possible to quickly and easily register three-dimensional images included in imaging series included in different examinations.

Since three-dimensional images included in imaging series in which the effective visual field is largely different are likely to include different parts, these three-dimensional images are not suitable for registration. Conversely, since three-dimensional images included in imaging series in which the difference in effective visual field is small are likely to include the same part, it is easy to perform registration between the three-dimensional images. Therefore, by acquiring the accessory information including the information of the effective visual field in three-dimensional images and selecting an imaging series including a three-dimensional image, in which the value indicating the difference in effective visual field is less than the predetermined second threshold value, from each of the two examinations based on the accessory information, it is possible to quickly and easily register three-dimensional images included in imaging series included in different examinations.

In an imaging series with a large effective visual field, the amount of information included in the three-dimensional image is large. Therefore, it is easy to perform registration in many cases. Therefore, by acquiring the accessory information including the information of the effective visual field in three-dimensional images and selecting an imaging series including a three-dimensional image, in which the effective visual field is less than the predetermined third threshold value, from each of the two examinations based on the accessory information, it is possible to quickly and easily register three-dimensional images included in imaging series included in different examinations.

In a case where it is determined whether or not registration is successful and it is determined that the registration has failed, it is possible to reliably perform registration between three-dimensional images included in the imaging series included in different examinations by further acquiring accessory information, further selecting the imaging series based on the acquired accessory information, and further performing registration between the slice positions of three-dimensional images included in the selected imaging series.

EXPLANATION OF REFERENCES

1: registration apparatus
2: three-dimensional image capturing apparatus
3: image storage server
4: network
11: CPU
12: memory
13: storage
14: display
15: input unit
21: image acquisition unit
22: accessory information acquisition unit
23: series selection unit
24: registration unit
25: display controller
50: image viewer
51: examination list area
52: thumbnail image area
53: image display area
53A to 53D: display area
C1 to C7, P1 to P5: imaging series
L0: examination list
Sc1, Sc2: scout image
V1, V2: three-dimensional image

What is claimed is:

1. A registration apparatus, comprising:
a processor configured to:
acquire, from each of two different examinations including a plurality of imaging series including three-dimensional images each of which is configured to include a plurality of tomographic images, accessory information regarding the three-dimensional images;
select one imaging series from each of the two examinations based on the accessory information; and
perform registration between the three-dimensional images included in the imaging series of the two examinations based on images included in the selected imaging series and acquire a result of the registration as a registration result between the two examinations,
wherein the processor is further configured to acquire the accessory information including information of tomographic planes of the tomographic images forming each of the three-dimensional images, and
select an imaging series including a three-dimensional image, in which the tomographic planes are axial cross sections, from each of the two examinations based on the accessory information.

2. The registration apparatus according to claim 1,
wherein the processor is further configured to acquire the accessory information including scout image information, which indicates presence or absence of a scout image for positioning of an imaging position at the time of acquiring the three-dimensional image, in the imaging series included in each of the two examinations,
in a case where the scout image information included in the accessory information in both the two examinations has the scout image, select an imaging series including the scout image from each of the two examinations based on the accessory information, and
perform the registration based on the scout image included in the selected imaging series.

3. The registration apparatus according to claim 2,
wherein the processor is further configured to, in a case where the scout image information included in the accessory information in at least one of the two examinations has no scout image, select the imaging series from each of the two examinations based on the accessory information other than the scout image information.

4. The registration apparatus according to claim 1,
wherein the processor is further configured to acquire the accessory information including information of a recording width in a direction perpendicular to the tomographic planes, and
select an imaging series having the smallest recording width from each of the two examinations based on the accessory information.

5. The registration apparatus according to claim 1,
wherein the processor is further configured to acquire the accessory information including information of a recording width in a direction perpendicular to the tomographic planes, and
select an imaging series, in which a value indicating a difference in the recording width is less than a predetermined first threshold value, from each of the two examinations based on the accessory information.

6. The registration apparatus according to claim 1,
wherein the processor is further configured to acquire the accessory information including information of an effective visual field in each of the three-dimensional images, and
select an imaging series including a three-dimensional image, in which a value indicating a difference in the effective visual field is less than a predetermined second threshold value, from each of the two examinations based on the accessory information.

7. The registration apparatus according to claim 1,
wherein the processor is further configured to acquire the accessory information including information of an effective visual field in each of the three-dimensional images, and
select an imaging series including a three-dimensional image, in which the effective visual field is equal to or greater than a predetermined third threshold value, from each of the two examinations based on the accessory information.

8. The registration apparatus according to claim 1,
wherein the processor is further configured to determine whether or not the registration is successful, and
in a case where the registration fails, select an imaging series based on the accessory information, and perform registration between three-dimensional images included in the further selected imaging series.

9. The registration apparatus according to claim 2,
wherein the processor is further configured to determine whether or not the registration is successful, and
in a case where the registration fails, select an imaging series based on the accessory information, and perform registration between three-dimensional images included in the further selected imaging series.

10. The registration apparatus according to claim 3,
wherein the processor is further configured to determine whether or not the registration is successful, and
in a case where the registration fails, select an imaging series based on the accessory information, and perform registration between three-dimensional images included in the further selected imaging series.

11. The registration apparatus according to claim 4,
wherein the processor is further configured to determine whether or not the registration is successful, and
in a case where the registration fails, select an imaging series based on the accessory information, and perform registration between three-dimensional images included in the further selected imaging series.

12. The registration apparatus according to claim 1,
wherein the processor is further configured to acquire offset values in three directions in the three-dimensional images as the registration result.

13. The registration apparatus according to claim 2,
wherein the processor is further configured to acquire offset values in three directions in the three-dimensional images as the registration result.

14. The registration apparatus according to claim 3,
wherein the processor is further configured to acquire offset values in three directions in the three-dimensional images as the registration result.

15. A registration method, comprising:
acquiring, from each of two different examinations including a plurality of imaging series including three-dimensional images each of which is configured to include a plurality of tomographic images, accessory information regarding the three-dimensional images, wherein the accessory information include information of tomographic planes of the tomographic images forming each of the three-dimensional images;
selecting one imaging series including a three-dimensional image, in which the tomographic planes are axial cross sections, from each of the two examinations based on the accessory information; and
performing registration between the three-dimensional images included in the imaging series of the two examinations based on images included in the selected imaging series and acquiring a result of the registration as a registration result between the two examinations.

16. A non-transitory computer readable recording medium storing a registration program causing a computer to execute:
acquiring, from each of two different examinations including a plurality of imaging series including three-dimensional images each of which is configured to include a plurality of tomographic images, accessory information regarding the three-dimensional images, wherein the accessory information include information of tomographic planes of the tomographic images forming each of the three-dimensional images;
selecting one imaging series including a three-dimensional image, in which the tomographic planes are axial cross sections, from each of the two examinations based on the accessory information; and
performing registration between the three-dimensional images included in the imaging series of the two examinations based on images included in the selected imaging series and acquiring a result of the registration as a registration result between the two examinations.

17. A registration apparatus, comprising:
a processor configured to:
acquire, from each of two different examinations including a plurality of imaging series including three-dimensional images each of which is configured to include a plurality of tomographic images, accessory information regarding the three-dimensional images;
select one imaging series from each of the two examinations based on the accessory information; and
perform registration between the three-dimensional images included in the imaging series of the two examinations based on images included in the selected imaging series and acquire a result of the registration as a registration result between the two examinations, wherein the processor is further configured to acquire the accessory information including scout image information, which indicates presence or absence of a scout image for positioning of an imaging position at the time of acquiring the three-dimensional image, in the imaging series included in each of the two examinations, in a case where the scout image information included in the accessory information in both the two examinations has the scout image, select an imaging series including the scout image from each of the two examinations based on the accessory information, and perform the registration based on the scout image included in the selected imaging series.

* * * * *